(12) United States Patent
Qiu et al.

(10) Patent No.: US 11,023,456 B2
(45) Date of Patent: *Jun. 1, 2021

(54) EXECUTING TRANSACTIONS BASED ON BLOCKCHAIN

(71) Applicant: Advanced New Technologies Co., Ltd., Grand Cayman (KY)

(72) Inventors: Honglin Qiu, Hangzhou (CN); Huabing Du, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,543

(22) Filed: Dec. 20, 2019

(65) Prior Publication Data

US 2020/0133939 A1    Apr. 30, 2020

Related U.S. Application Data

(63) Continuation of application No. 16/287,590, filed on Feb. 27, 2019.

(30) Foreign Application Priority Data

Feb. 27, 2018    (CN) .......................... 201810162067.3

(51) Int. Cl.
*G06F 16/30*    (2019.01)
*G06F 16/23*    (2019.01)
(Continued)

(52) U.S. Cl.
CPC ...... *G06F 16/2365* (2019.01); *G06F 21/6218* (2013.01); *G06F 21/64* (2013.01);
(Continued)

(58) Field of Classification Search
CPC .. G06F 21/64; G06F 16/2365; G06F 21/6218; G06F 20/02; G06F 20/3827;
(Continued)

(56) References Cited

U.S. PATENT DOCUMENTS 6,081,805 A    6/2000 Guha
8,560,503 B1   10/2013 McManis
(Continued)

FOREIGN PATENT DOCUMENTS

CN    106055597    10/2016
CN    106780033    5/2017
(Continued)

OTHER PUBLICATIONS

Article entitled ""Blockstack: A Global Naming and Storage System Secured by Blockchains," USENIX Annual Technical Conference", dated Jun. 24, 2016, by Ali et al.*

(Continued)

*Primary Examiner* — Mahesh H Dwivedi
(74) *Attorney, Agent, or Firm* — Fish & Richardson P.C.

(57) ABSTRACT

At a node device associated with a blockchain as a received target transaction, a target transaction published by a user is received, where the received target transaction includes transaction content, and where at least a part of the transaction content includes a content summary associated with target content that is stored in a third-party storage system connected to the blockchain. By the node device and to the third-party storage system, the target content corresponding to the content summary is queried. By the node device, whether the target content is verified is determined. In response to determining that the target content is verified, by the node device, the received target transaction is executed based on the transaction content. By the node device, the (Continued)

received target transaction is stored in a distributed database associated with the blockchain.

18 Claims, 5 Drawing Sheets

(51) Int. Cl.
*G06F 21/62* (2013.01)
*G06F 21/64* (2013.01)
*G06Q 20/02* (2012.01)
*G06Q 20/38* (2012.01)

(52) U.S. Cl.
CPC ......... *G06Q 20/02* (2013.01); *G06Q 20/3827* (2013.01); *G06Q 20/389* (2013.01)

(58) Field of Classification Search
CPC ... G06Q 20/02; G06Q 20/3827; G06Q 20/389
See application file for complete search history.

(56) References Cited

U.S. PATENT DOCUMENTS

| | | | |
|---|---|---|---|
| 9,794,074 | B2 | 10/2017 | Toll et al. |
| 2015/0262137 | A1 | 9/2015 | Armstrong |
| 2016/0292672 | A1 | 10/2016 | Fay et al. |
| 2016/0321654 | A1 | 11/2016 | Lesavich et al. |
| 2017/0132626 | A1* | 5/2017 | Kennedy ............ G06Q 20/401 |
| 2017/0134280 | A1* | 5/2017 | Davis ................. H04L 63/123 |
| 2017/0212781 | A1 | 6/2017 | Dillenberger et al. |
| 2017/0213209 | A1 | 7/2017 | Dillenberger |
| 2017/0232300 | A1 | 8/2017 | Tran et al. |
| 2017/0237606 | A1 | 8/2017 | Canessa et al. |
| 2017/0330174 | A1 | 11/2017 | DeMarinis et al. |
| 2018/0025181 | A1 | 1/2018 | Barinov et al. |
| 2018/0082296 | A1* | 3/2018 | Brashers ............. H04L 63/0428 |
| 2018/0285837 | A1 | 10/2018 | Wu et al. |
| 2018/0300693 | A1* | 10/2018 | Gopinath ........... G06Q 20/4016 |
| 2019/0014176 | A1* | 1/2019 | Tormasov .......... H04L 41/5019 |
| 2019/0188711 | A1* | 6/2019 | Wu .................... G06Q 20/065 |
| 2019/0266145 | A1 | 8/2019 | Qiu et al. |

FOREIGN PATENT DOCUMENTS

| | | |
|---|---|---|
| CN | 106878000 | 6/2017 |
| CN | 106897351 | 6/2017 |
| CN | 106909605 | 6/2017 |
| CN | 107085810 | 8/2017 |
| CN | 107146087 | 9/2017 |
| CN | 107222312 | 9/2017 |
| CN | 107247773 | 10/2017 |
| CN | 107257341 | 10/2017 |
| CN | 107273410 | 10/2017 |
| CN | 107392040 | 11/2017 |
| CN | 107423978 | 12/2017 |
| CN | 107423980 | 12/2017 |
| CN | 107592292 | 1/2018 |
| CN | 107730225 | 2/2018 |
| CN | 107833052 | 3/2018 |
| TW | M542178 | 5/2017 |
| WO | WO 2006052939 | 5/2006 |
| WO | WO 2017079218 | 5/2017 |
| WO | WO 2017083143 | 5/2017 |
| WO | WO 2017091530 | 6/2017 |

OTHER PUBLICATIONS

Article entitled "Using Blockchain to Protect Personal Privacy in the Scenario of Online Taxi-hailing", by Zhang et al., dated Dec. 2017.*
Crosby et al., "BlockChain Technology: Beyond Bitcoin," Sutardja Center for Entrepreneurship & Technology Technical Report, Oct. 16, 2015, 35 pages.
Eberhardt et al, "On or Off the Blockchain? Insights on Off-Chaining Computation and Data", International Conference on Financial Cryptography and Data Security; Sep. 2017, 13 pages.
International Search Report and Written Opinion in International Application No. PCT/US2019/019658, dated Apr. 16, 2019, 13 pages.
Nakamoto, "Bitcoin: A Peer-to-Peer Electronic Cash System," www.bitcoin.org, 2005, 9 pages.
Written Opinion of the International Preliminary Examining Authority in International Appln. No. PCT/US2019/019658, dated Feb. 5, 2020, 9 pages.
International Preliminary Report on Patentability in International Application No. PCT/US2019/019658, dated Jun. 22, 2020, 7 pages.

* cited by examiner

EXECUTING TRANSACTIONS BASED ON BLOCKCHAIN

CROSS-REFERENCE TO RELATED APPLICATIONS

This application claims priority to U.S. application Ser. No. 16/287,590 filed Feb. 27, 2019, which claims priority to Chinese Patent Application No. 201810162067.3, filed on Feb. 27, 2018. The contents of the prior U.S. and Chinese applications are hereby incorporated by reference in their entirety.

TECHNICAL FIELD

One or more implementations of the present disclosure relate to the field of blockchain technologies, and in particular, to a method, an apparatus, and an electronic device for executing transactions based on a blockchain.

BACKGROUND

Blockchain technology, also known as a distributed ledger technology, is an emerging technology in which several computing devices participate in "accounting" to jointly maintain a complete distributed database. The blockchain technology has the characteristics of decentralization, openness, and transparency, each computing device can participate in database recording, and data can be quickly synchronized between computing devices. Therefore, the blockchain technology is used to build the decentralized system, and various execution programs are recorded in the distributed database of the blockchain and are automatically executed, which has been widely used in many fields. For example, in the field of financial technology, using the blockchain technology to build a P2P payment platform and publishing executive programs such as smart contracts on the blockchain can implement point-to-point secure payment between different users without financial institutions such as banks.

SUMMARY

The present specification discloses a method for executing transactions based on a blockchain, including: receiving, by a node device of a blockchain, a target transaction, where at least a part of transaction content in the target transaction includes a content summary of target content stored in a third-party storage system connected to the blockchain; querying, to the third-party storage system, target content corresponding to the content summary, and verifying the target content; and if the verification of the target content succeeds, executing the target transaction based on the transaction content in the target transaction, and storing the target transaction in a distributed database of the blockchain after the target transaction is executed.

Optionally, the third-party storage system stores a mapping relationship between the target content and the content summary of the target content; and the querying, to the third-party storage system, target content corresponding to the content summary includes: using the content summary as a query index and initiating a query to the third-party storage system to query the target content corresponding to the content summary.

Optionally, the verifying the target content includes: calculating a content summary of the target content based on a preset summary algorithm; determining whether the content summary obtained through calculation is consistent with the content summary of the target content in the target transaction; and if the content summary obtained through calculation is consistent with the content summary of the target content in the target transaction, determining that the verification of the target content succeeds.

Optionally, the third-party storage system includes a centralized content-addressable-storage (CAS) system, or a distributed CAS system.

Optionally, the blockchain includes any member blockchain in a consortium blockchain composed of a plurality of member blockchains.

Optionally, the third-party storage system is another member blockchain in the consortium blockchain that has a cross-chain data reference relationship with the described blockchain.

Optionally, the consortium blockchain is a directed acyclic graph (DAG) structure constructed based on a cross-chain data reference relationship between member blockchains.

The present specification further discloses an apparatus for executing transactions based on a blockchain, including: a receiving module, configured to receive a target transaction, where at least a part of transaction content in the target transaction includes a content summary of target content stored in a third-party storage system connected to the blockchain; a query module, configured to query, to the third-party storage system, target content corresponding to the content summary, and verify the target content; and an execution module, configured to: if the verification of the target content succeeds, execute the target transaction based on the transaction content in the target transaction, and store the target transaction in a distributed database of the blockchain after the target transaction is executed.

Optionally, the third-party storage system stores a mapping relationship between the target content and the content summary of the target content; and the query module is configured to: use the content summary as a query index and initiate a query to the third-party storage system to query the target content corresponding to the content summary.

Optionally, the execution module is further configured to: calculate a content summary of the target content based on a preset summary algorithm; determine whether the content summary obtained through calculation is consistent with the content summary of the target content in the target transaction; and if the content summary obtained through calculation is consistent with the content summary of the target content in the target transaction, determine that the verification of the target content succeeds.

Optionally, the third-party storage system includes a centralized content-addressable-storage (CAS) system, or a distributed CAS system.

Optionally, the blockchain includes any member blockchain in a consortium blockchain composed of a plurality of member blockchains.

Optionally, the third-party storage system is another member blockchain in the consortium blockchain that has a cross-chain data reference relationship with the described blockchain.

Optionally, the consortium blockchain is a directed acyclic graph (DAG) structure constructed based on a cross-chain data reference relationship between member blockchains.

The present specification further discloses an electronic apparatus, including: a processor; and a memory, configured to store a machine-executable instruction, where by reading and executing the machine-executable instruction that is stored in the memory and corresponding to a transaction execution control logic based on a blockchain, the processor is configured to: receive a target transaction, where at least a part of transaction content in the target transaction includes a content summary of target content stored in a third-party storage system connected to the blockchain; query, to the third-party storage system, target content corresponding to the content summary, and verify the target content; and if the verification of the target content succeeds, execute the target transaction based on the transaction content in the target transaction, and store the target transaction in a distributed database of the blockchain after the target transaction is executed.

According to the previously described implementations, the content summary of the target content stored in the third-party storage system connected to the blockchain is carried in the transaction content of the transaction published to the blockchain. As such, the node device receiving the transaction in the blockchain can query the third-party storage system for the corresponding target content based on the content summary, verify the target content, execute the transaction after the verification of the target content succeeds, and store the transaction in the distributed database of the blockchain after the transaction is executed. As such, a user can refer to the target content stored in the third-party storage system connected to the blockchain as the transaction content in the transaction published to the blockchain so as to alleviate redundant storage of data in the blockchain caused by synchronizing the original content of the target content stored in the above-mentioned third-party storage system to each node device in the blockchain.

DESCRIPTION OF IMPLEMENTATIONS

Figure 1:
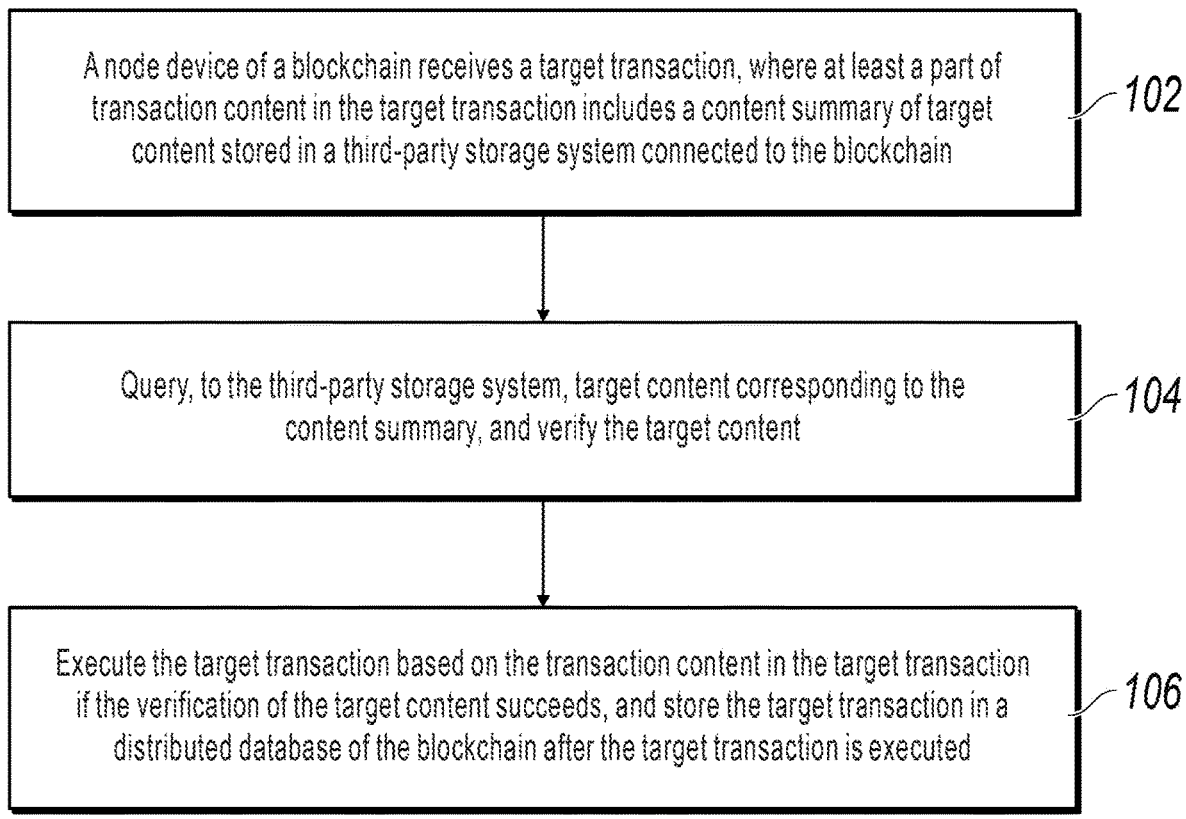
FIG. 1 is a flowchart illustrating a method for executing transactions based on a blockchain, according to an example implementation.

In the traditional blockchain transaction process, transaction content in a transaction (transfer) usually comes from data content stored in a distributed database (namely a blockchain ledger) of the blockchain, and data content stored in an external storage cannot be referred to. Therefore, for each node device in the blockchain network, when a transaction published by a member accessing the blockchain is executed, data content involved in the transaction content is all from the chain, and thus a "data use closed loop" is formed.

The present specification intends to disclose a technical solution for breaking the "data use closed loop" of the blockchain by referencing immutable data content stored in a third-party storage platform as transaction content in a blockchain transaction (transfer).

In implementation, the blockchain can be connected to a third-party storage system in advance. The third-party storage system can pre-store some immutable data content that can be referred to by the transaction published on the blockchain. When a member accessing the blockchain publishes a transaction to the blockchain, a content summary of the data content stored in the third-party storage system can be added to the transaction to refer to the data content stored in the third-party storage system as the transaction content.

When the node device on the blockchain receives a transaction published by the member, the node device can initiate a query to the third-party storage system based on the content summary to query the data content corresponding to the content summary and verify the data content that is queried. If verification of the content succeeds, the transaction can be executed based on the complete transaction content in the transaction, and the transaction is stored in the distributed database of the blockchain after the transaction is completed.

In the described implementation, the content summary of the target content stored in the third-party storage system connected to the blockchain is carried in the transaction content of the transaction published to the blockchain. As such, the node device receiving the transaction in the blockchain can query the third-party storage system for the corresponding target content based on the content summary, verify the target content, execute the transaction after the verification of the target content succeeds, and store the transaction in the distributed database of the blockchain after the transaction is executed. As such, the user can refer to the target content stored in the third-party storage system connected to the blockchain as the transaction content in the transaction published to the blockchain so as to alleviate redundant storage of data in the blockchain caused by synchronizing the original content of the target content stored in the third-party storage system to each node device in the blockchain.

The present specification is described below by using specific implementations with reference to specific application scenarios.

FIG. 1 shows a method for executing transactions based on a blockchain provided in an implementation of the present specification. The method is applied to a node device in the blockchain, and the node device performs the following steps.

Step 102. A node device of a blockchain receives a target transaction; where at least a part of transaction content in the target transaction includes a content summary of target content stored in a third-party storage system connected to the blockchain.

Step 104. Query, to the third-party storage system, target content corresponding to the content summary, and verify the target content.

Step 106. If the verification of the target content succeeds, execute the target transaction based on the transaction content in the target transaction, and store the target transaction in a distributed database of the blockchain after the target transaction is executed. The blockchain described in the present specification can include any blockchain network where immutable data content stored in the third-party storage system connected to the blockchain can be referenced as the transaction content in the supported blockchain transaction.

For example, in a scenario, the previously described blockchain can be any member blockchain in a consortium blockchain composed of a plurality of member blockchains. In a blockchain transaction supported in each member blockchain in the consortium blockchain, data content stored in other member blockchains can be referenced as transaction content across the chain.

The previously described third-party storage system includes a content-addressable-storage (CAS) platform that provides reliable data storage services for the blockchain. The so-called content addressable means that data is no longer addressed by using a storage offset of the data in a storage system but addressed by using content of the data.

In the CAS platform, a content summary of the stored data content (such as a content hash value obtained through hash calculation for the data content) can be used as a query index of the original data content, and a mapping relationship between the query index and the original data content is stored. As such, the data querying party can query the corresponding original data content from the CAS platform by using the content summary as the query index.

In actual applications, the previously described third-party storage system can include a traditional centralized content-addressable-storage (CAS) system; or can include a decentralized distributed CAS system.

For example, in a scenario, the previously described blockchain can be any member blockchain in a consortium blockchain composed of a plurality of member blockchains. The previously described third-party storage system can be specifically, for example, a distributed system based on an Object Storage Service (OSS) architecture that is deployed in the consortium blockchain and can be connected to each member blockchain in the consortium blockchain.

Alternatively, in another example, another member blockchain, in the previously described consortium blockchain other than the described blockchain, that has a cross-chain data reference relationship with the described blockchain can be used as the third-party storage system connected to the described blockchain to implement cross-chain data reference between the member blockchains.

The following describes in detail the technical solutions of the present specification by using an example that the previously-described blockchain is a member blockchain in the consortium blockchain consisting of a plurality of member blockchains with reference to "third-party storage system deployment", "transaction content reference", "transaction content addressing", and "transaction execution".

(1) Third-Party Storage System Deployment

In the present specification, an operator can pre-establish a consortium blockchain consisting of a plurality of member blockchains. Each member blockchain in the consortium blockchain is a consortium member in the consortium blockchain. The previously described blockchain can be any member blockchain in the consortium blockchain.

The operator of the consortium blockchain can also deploy a third-party storage system in the consortium blockchain to connect to the member blockchains in the consortium blockchain and provide reliable data storage services for the member blockchains.

For example, the described third-party storage system can provide a continuous and reliable API access interface for each member blockchain so that the member blockchains in the consortium blockchain can connect to the third-party storage system by accessing the API access interface.

When a third-party storage system is deployed in the consortium blockchain, a global third-party storage system can be deployed for the consortium blockchain, or one independent third-party storage system can be deployed for each member blockchain in the consortium blockchain. Implementations are not limited in this specification.

In the present specification, the described third-party storage system can be a CAS system that supports content addressability. In actual applications, the described third-party storage system can be a traditional centralized CAS system, or can be a distributed CAS system.

The described distributed CAS system can include a traditional centralized distributed system and a decentralized distributed system.

In an implementation, the third-party storage system can be specifically, for example, a centralized distributed system based on an OSS architecture that is deployed in the consortium blockchain and can be connected to each member blockchain in the consortium blockchain.

In another implementation, the described third-party storage system can also be a decentralized distributed system. In implementation, another member blockchain, in the previously described consortium blockchain other than the described blockchain, that has a cross-chain data reference relationship with the described blockchain can be used as the third-party storage system connected to the described blockchain. In other words, any member blockchain in the consortium blockchain can be used as a third-party storage system connected to another member blockchain to implement cross-chain data reference.

For example, in a scenario, an operator can establish a consortium blockchain based on actual service needs and assign different service roles to member blockchains in the consortium blockchain. In other words, the consortium blockchain corresponds to a complete service process, and each member blockchain can correspond to one sub-process in the complete service process.

In an example of a consortium blockchain established by the operator based on the service need of "online leasing transaction", member blockchains constituting the consortium blockchain can include a "transaction chain", an "authentication chain", and a "data chain". The "transaction chain", the "authentication chain", and the "data chain" can each correspond to a sub-process in the "online leasing transaction" service process. For example, the "data chain" is used to maintain real-name data of the leasing user; the "authentication chain" is used to complete leasing real-name authentication for the user; and the "transaction chain" is used to complete the online leasing transaction.

Then the operator can construct the consortium blockchain to a topology map with a directed acyclic graph (DAG) structure at the service level based on a one-way cross-chain data reference relationship between member blockchains.

It is worthwhile to note that the one-way cross-chain data reference relationship between the member blockchains usually depends on actual service needs, and is not particularly limited in the present specification.

Figure 2:
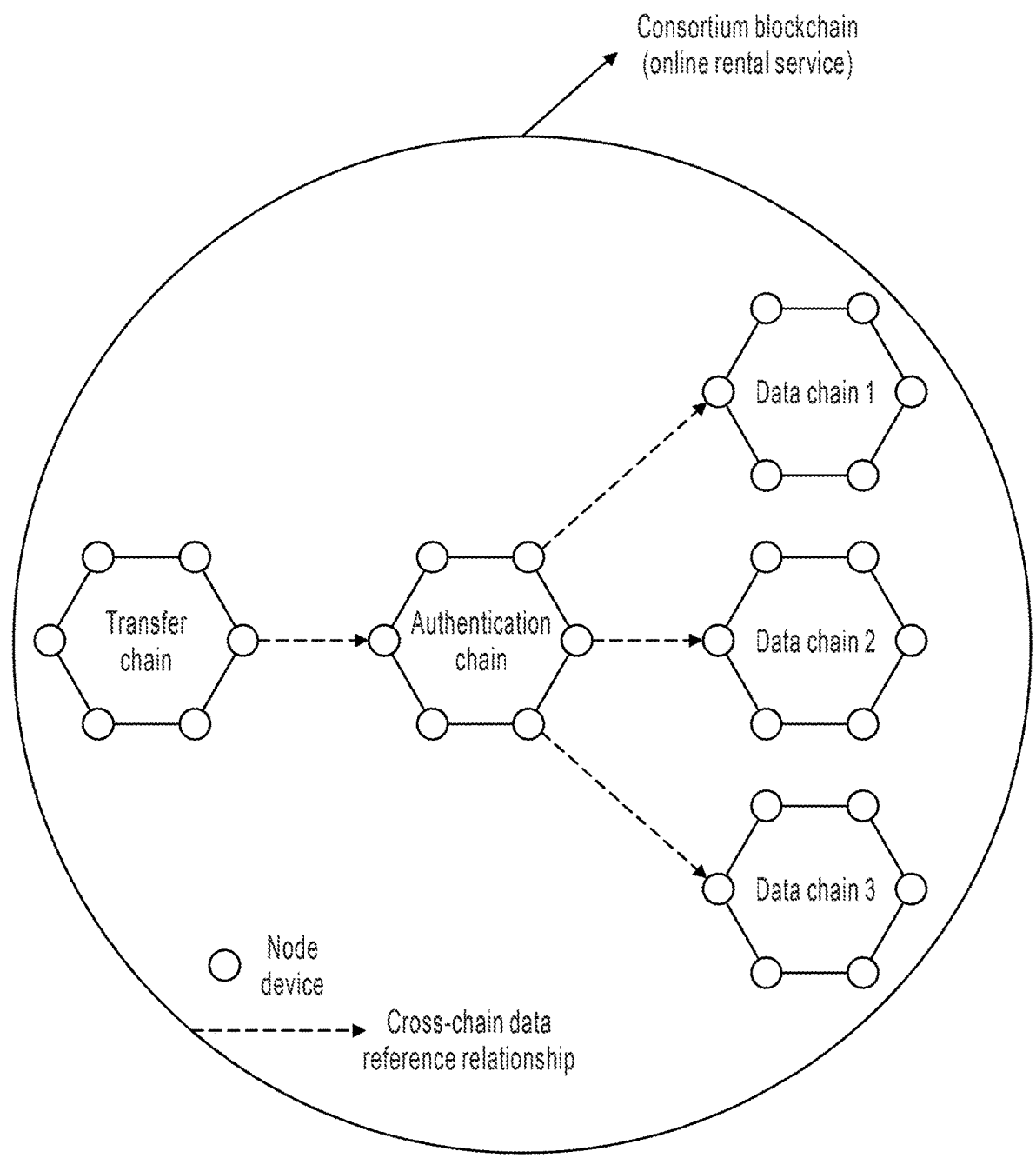
FIG. 2 is a schematic structural diagram illustrating a consortium blockchain, according to an example implementation.

For example, FIG. 2 is a schematic diagram illustrating a consortium blockchain with the DAG structure in an example.

As shown in FIG. 2, still in the example of a consortium blockchain established by the operator based on the service need of "online leasing transaction", member blockchains constituting the consortium blockchain can include a "transaction chain", an "authentication chain", and a "data chain". The "data chain" is used to maintain real-name data of the leasing user, and the user can store the personal real-name data in a distributed database of the "data chain" by publishing a transaction on the "data chain". The "authentication chain" is used to refer to the real-name data of the user published on the "data chain" to complete leasing real-name authentication for the user. The user can complete the personal real-name authentication by publishing a transaction on the "authentication chain" and publish the real-name authentication result in a distributed database of the "authentication chain". The "transaction chain" is used to refer to the real-name authentication result for the user that is published on the "authentication chain". The user can complete the online leasing transaction by publishing a transaction on the "transaction chain" and publish the transaction result in a distributed database of the "authentication chain".

Another member blockchain having a cross-chain data reference relationship with any target member blockchain in the previously described consortium blockchain is used as a distributed storage platform connected to the target member blockchain. Therefore, cross-chain data reference between the member blockchains can be implemented at the service level. In addition, the member blockchain used as the third-party storage system no longer needs to synchronize the original content of the previously described referenced target content to each node device in the previously described target member blockchain, and the target member blockchain does not need to store the original content of the previously described target content. As such, the target member blockchain does not need to perform additional data association for the original content of the target content stored in the target member blockchain and the referenced target content synchronized by the member blockchain used as the third-party storage system. Therefore, data association of the referenced target content on two different blockchains can be achieved by using only the content summary of the referenced target content, and it can be ensured that the target content referenced by the previously described target member blockchain and the referenced target content stored on the member blockchain used as the third-party storage system are consistent in business semantics.

(2) Transaction Content Reference

In the present specification, a user who needs to access the consortium blockchain can register with the consortium blockchain in advance to obtain a pair of public and private keys returned by the consortium blockchain. After the registration is completed, the consortium blockchain can create a corresponding account object for the user.

The registered user can access each member blockchain through the API interface provided by each member blockchain in the consortium blockchain, and complete corresponding service operations in each member blockchain by publishing a transaction that is signed based on the held private key to each member blockchain. For example, taking the "transaction chain" in the consortium blockchain shown in FIG. 2 as an example, the user can complete the online leasing transaction by publishing a transaction in the "transaction chain".

In implementation, the operator of the consortium blockchain can develop client software (such as APP) for members accessing the consortium blockchain, and the members can assemble transaction data through the client software based on the standard transaction format supported by the consortium blockchain, and invoke the API interface provided by each member blockchain to publish the assembled transaction data to the target member blockchain specified by the member in the consortium blockchain for execution.

The transaction data assembled by the member through the client software can carry the transaction content specified by the member, and at least a part of the transaction content can be replaced by a content summary.

In an implementation, the member can fill in the transaction content through the client software when assembling the transaction data that needs to be executed on the target member blockchain through the client software. The client software can parse the transaction content filled by the member to determine whether the transaction content filled by the member exists in the third-party storage system that is connected to the target member blockchain.

If the transaction content filled by the member exists in the transaction content stored in the third-party storage system, the third-party storage system can be queried for the content summary (that is, the query index) corresponding to the transaction content. Alternatively, a content summary for the part of the transaction content is recalculated based on the same content summary algorithm supported by the third-party storage system, and then the content summary is filled in a marked transaction format.

For example, in implementation, a content summary field for carrying transaction content can be extended in a standard transaction format supported by the consortium blockchain. When the client software assembles the transaction data based on the standard transaction format, content summaries of all transaction content already stored in the previously described third-party storage system can be filled in the content summary field.

(3) Transaction Content Addressing

The node device that is connected to the registered member user in the previously described target member blockchain in the present specification can first perform identity authentication on the user based on a public key corresponding to the private key held by the member after receiving the transaction published by the user based on the private key.

For example, in actual applications, a user can sign an initiated transaction based on a private key held, and a node device in the blockchain can attempt to authenticate the signature based on a public key corresponding to the private key held by the user. If the signature has been authenticated, identity authentication of the user succeeds.

After the identity authentication of the user succeeds, the node device can parse transaction content carried in the received transaction to determine whether a content summary exists in the transaction content carried in the transaction.

For example, the node device can determine whether a content summary exists in the transaction content carried in the transaction, through parsing whether a content summary field for carrying the transaction content extended in the standard transaction format is a null value.

If the content summary exists in the transaction content carried in the transaction, it indicates that a part of the transaction content in the transaction is the reference of the data content already stored in the described third-party storage system. In this case, in order to obtain the complete transaction content carried in the transaction, the node device can query the third-party storage system that is connected to the target member blockchain for the target content corresponding to the content summary.

In implementation, the node device can set up a query request, use the content summary as a query index, add the content summary to the query request, and then submit the query request to the third-party storage system. After receiving the query request, the third-party storage system can read the query index from the query request, then traverse the mapping relationship between the locally stored data content and the content summary based on the query index to search for the target content corresponding to the query index, and return the target content to the node device.

It is worthwhile to note that, in actual applications, in addition to the content summary used as the query index, the described query request can further carry some auxiliary query parameters to facilitate quick query of the target content corresponding to the content summary.

For example, the third-party storage system connected to the target member blockchain is another member blockchain in the consortium blockchain that has a cross-chain data reference relationship with the target member blockchain. In this case, because the referenced data content and the corresponding content summary stored in the other member blockchain serving as the third-party storage system are usually stored in a distributed database of the blockchain in the form of a block, the described query request can further carry the number of the member block chain in which the content summary is located, the block number, etc. as auxiliary query parameters to facilitate the query.

(4) Transaction Execution

In the present specification, after the node device identifies the target content corresponding to the content summary carried in the received transaction from the third-party storage system that is connected to the target member blockchain, the node device can execute the transaction in the target member blockchain based on the complete transaction content carried in the transaction.

First, the node device can verify the identified target content to ensure that the identified target content is consistent with the data content corresponding to the content summary.

In implementation, the node device can recalculate a content summary of the target content that is identified, and then match the content summary obtained through recalculation with the content summary carried in the received transaction to determine whether the content summary obtained through recalculation is consistent with the content summary carried in the received transaction.

If the content summary obtained through recalculation is consistent with the content summary carried in the received transaction, the verification of the identified target content succeeds, the transaction received by the node device is a valid transaction, and the node device can obtain the complete transaction content carried in the transaction.

If the content summary obtained through recalculation is inconsistent with the content summary carried in the received transaction, the verification of the identified target content fails. In this case, the original referenced target content stored in the described third-party storage system is probably modified and updated due to the unreliability of the system, the transaction is an invalid transaction, and the node device can directly terminate the transaction.

It is worthwhile to note that, when the node device recalculates the content summary of the identified target content, a data structure of the target content, a method of encoding the target content, and a summary algorithm used are all required to be consistent with those in the third-party storage system so as to ensure that the node device and the third-party storage system can obtain the same calculation result when performing content summary calculation for the same target content.

Further, the node device can further perform consensus processing on a valid transaction (that is, a transaction whose content has been authenticated) received during a period of time based on the consensus algorithm supported by the target member blockchain, and execute the transaction in the target member blockchain based on the complete transaction content carried in the transaction after the consensus processing is completed.

The consensus algorithm supported by each member blockchain in the consortium blockchain is not particularly limited in the present specification, and the consensus algorithms supported by the member blockchains can be the same or different.

It is worthwhile to note that, in the present specification, when the node device executes the transaction in the target member blockchain based on the complete transaction content in the obtained transaction, generally the following two situations can be included.

In one situation, the transaction that the member user publishes in the previously described target member blockchain can specifically be a transaction executed automatically by invoking a smart contract published in the target member blockchain. For example, the described transaction can specifically be an online value transfer (such as a cross-border transfer) completed in the blockchain by invoking a smart contract.

In this case, an execution program that can be invoked and associated with the transaction can be pre-declared in the smart contract. For example, the execution program can specifically be executable code, function, etc. related to the transaction condition declared in the smart contract; and the transaction content carried in the transaction is used as an input parameter for invoking the smart contract. After obtaining the transaction content carried in the transaction, the node device can initiate an invocation to the smart contract and submit the input parameters to the execution program declared in the smart contract for execution to complete the transaction.

In the other situation, the transaction that the member user publishes in the previously described target member blockchain can specifically be a standard transaction supported by the target member blockchain. The standard transaction can be completed without invoking the smart contract. For example, the described transaction can specifically be a transaction supported by the previously described target member blockchain such as "certificate transaction". For example, as shown in the "data chain" in FIG. 2, the user can publish a "certificate transaction" to the "data chain" and store real name information of the user in a distributed database of the "data chain", and once the transaction is published, the real name information of the user cannot be tampered with.

In this case, the node device can first check validity of the transaction when executing the transaction. If the validity check confirms that the transaction is valid, the node device can further broadcast the transaction in the target member blockchain and synchronize the transaction to other node devices in the target member blockchain, and other node devices check the validity of the transaction. If most of the node devices in the target member blockchain (such as 51%) have validated the transaction and confirmed that the transaction is valid, the transaction is completed.

In the present specification, after the node device executes the received transaction, the node device can further store the transaction in the distributed database of the target member blockchain.

Information recorded in the distributed database of the blockchain usually includes a transaction log and a transaction state.

The transaction log is used for storing a log of the transactions, includes a series of blocks in the order of occurrence, and is a transaction record in the distributed database.

The transaction state is used to store state changes caused by transactions recorded in the distributed database. For example, a blockchain usually includes many small objects (such as account objects, contract objects, asset objects, etc.), each time a transaction is submitted in a distributed database of the blockchain, after the transaction is completed, states related to the transaction will be updated synchronously. For example, taking the online transfer transaction submitted in the blockchain as an example, after the execution of the transaction, the balance of the account object related to the transfer will be updated synchronously.

In this case, after the node device executes the received transaction, the node device can further store the transaction in the distributed database of the target member blockchain.

In one aspect, the transaction can be written into the transaction log stored in the distributed database of the target member blockchain in the generated block.

In the other aspect, state changes of related objects caused by the transaction can be updated in the transaction state. For example, still taking the online transfer transaction submitted in the blockchain as an example, after the execution of the transaction, the balance of the account object related to the transfer can be updated in the transaction state.

In the previous implementation, the original content of the referenced data can be stored in the third-party storage system, and only the content summary of the referenced data content is stored in the blockchain. When the blockchain performs a transaction or performs transaction tracing, the blockchain reads the original content of the referenced data from the third-party storage system based on the content summary.

As such, it can alleviate redundant storage of data in the blockchain that is caused by synchronizing the original content of the target content stored in the previously described third-party storage system to each node device on the blockchain.

For example, the third-party storage system connected to the target blockchain is another blockchain that has a cross-chain data reference relationship with the described blockchain is used as an example. Assume that the other blockchain includes 5 node devices, and the target blockchain includes 50 node devices. If the method of synchronizing referenced data content stored in the other blockchain to the target blockchain is still used, the referenced data content needs to be synchronized to 50 nodes in the target blockchain, causing a large amount of redundancy of the referenced data content in the target blockchain. However, if the target blockchain only stores the content summary of the referenced data content, the other blockchain no longer needs to separately synchronize the referenced data content to the 50 node devices, thereby significantly reducing the data storage redundancy of the described target blockchain.

In addition, the storage performance of the blockchain can be significantly improved.

For example, in actual applications, if the previously described referenced data content is a large media file such as a picture or a video, the storage performance of the blockchain network is reduced if these media files are directly stored in the described target member blockchain. Therefore, the data storage performance of the described target member blockchain can also be improved to some extent by using the method.

Figure 3:
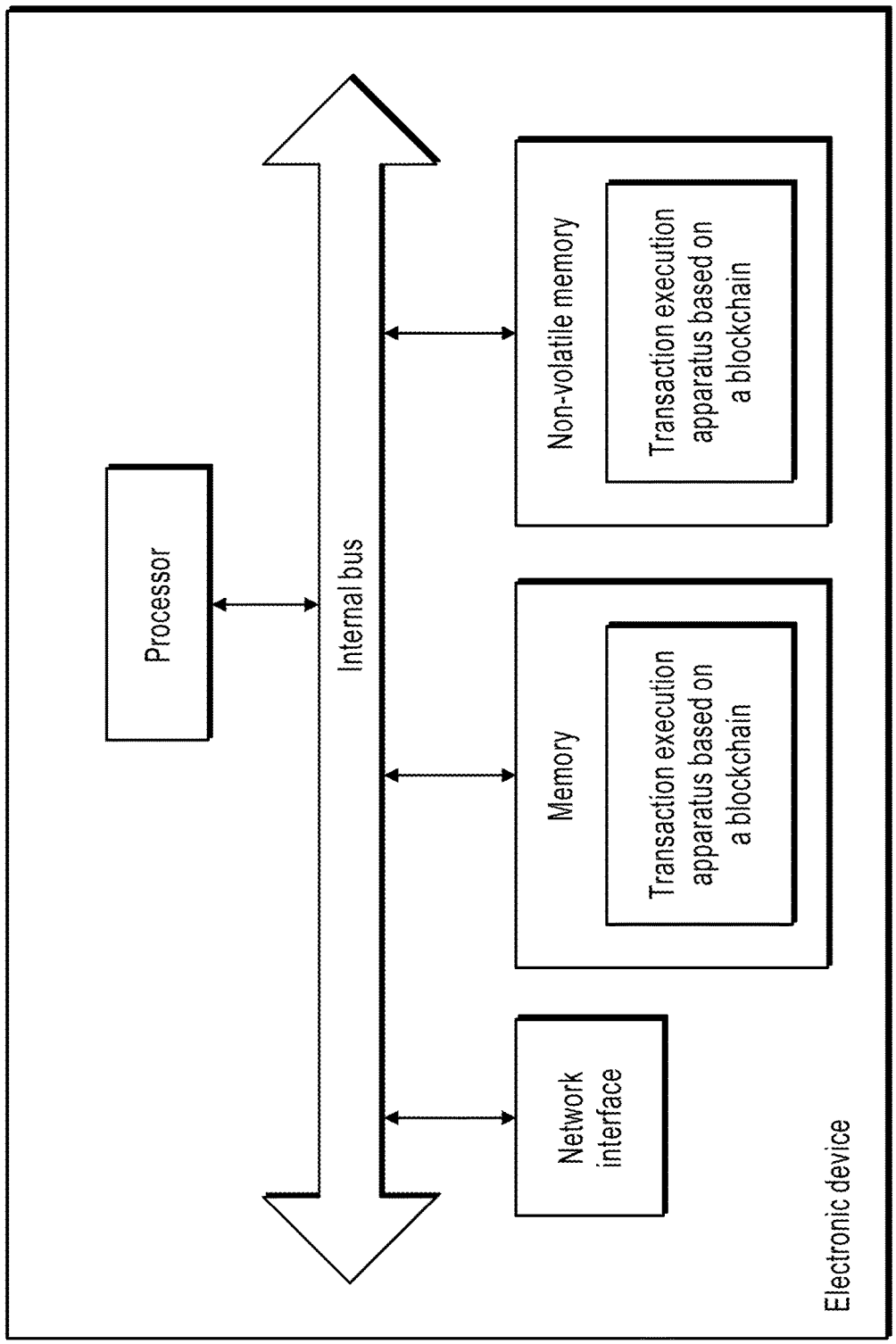
FIG. 3 is a schematic structural diagram illustrating an electronic device, according to an example implementation.

Corresponding to the previously described method implementation, the present specification further provides an implementation of an apparatus for executing transactions based on a blockchain. The implementation of the apparatus for executing transactions based on a blockchain in the present specification can be applied to an electronic device. The device implementation can be implemented by software, or can be implemented by hardware or a combination of hardware and software. Software implementation is used as an example. As a logical device, the device is formed by reading a corresponding computer program instruction in a non-volatile memory to a memory by a processor of an electronic device where the device is located. In terms of hardware, referring to FIG. 3, FIG. 3 is a hardware structural diagram illustrating an electronic device where the apparatus for executing transactions based on a blockchain is located in the present specification. In addition to a processor, a memory, a network interface, and a non-volatile memory shown in FIG. 3, the electronic device where the apparatus is located in the implementations can usually include other hardware based on an actual function of the electronic device. Details are omitted here for simplicity.

Figure 4:
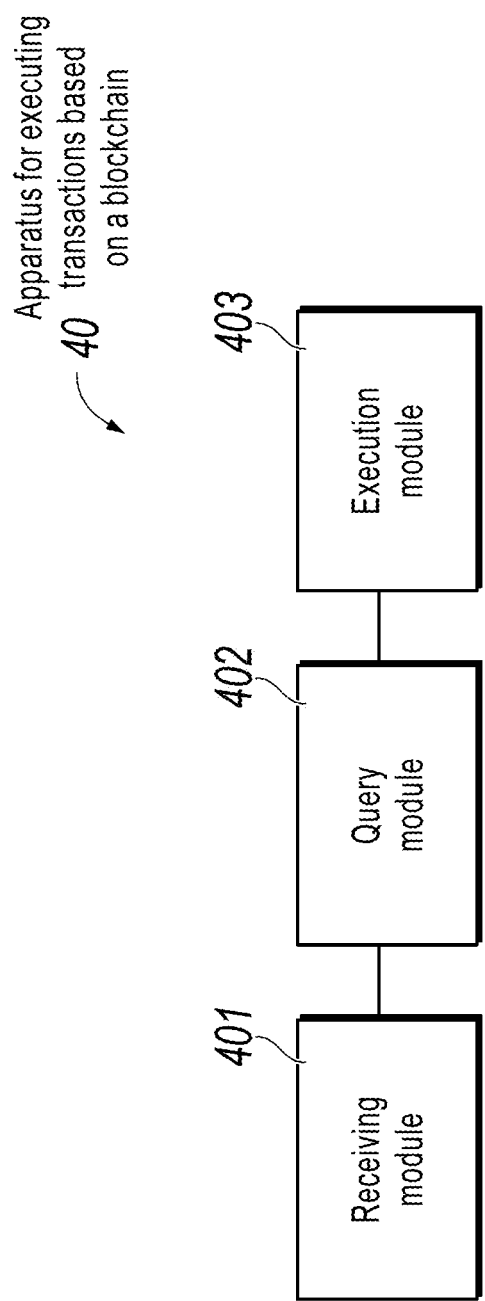
FIG. 4 is a block diagram illustrating an apparatus for executing transactions based on a blockchain, according to an example implementation.

FIG. 4 is a block diagram illustrating an apparatus for executing transactions based on a blockchain, according to an example implementation of the present specification.

Referring to FIG. 4, the apparatus 30 for executing transactions based on a blockchain can be applied to the electronic device shown in FIG. 2, and includes a receiving module 401, a query module 402, and an execution module 403.

The receiving module 401 is configured to receive a target transaction, where at least a part of transaction content in the target transaction includes a content summary of target content stored in a third-party storage system connected to the blockchain.

The query module 402 is configured to query, to the third-party storage system, target content corresponding to the content summary, and verify the target content.

The execution module 403 is configured to: if the verification of the target content succeeds, execute the target transaction based on the transaction content in the target transaction, and store the target transaction in a distributed database of the blockchain after the target transaction is executed.

In the present implementation, the third-party storage system stores a mapping relationship between the target content and the content summary of the target content; and the query module 402 is configured to: use the content summary as a query index and initiate a query to the third-party storage system to query the target content corresponding to the content summary.

In the present implementation, the execution module 403 is further configured to: calculate a content summary of the target content based on a preset summary algorithm; determine whether the content summary obtained through calculation is consistent with the content summary of the target content in the target transaction; and if the content summary obtained through calculation is consistent with the content summary of the target content in the target transaction, determine that the verification of the target content succeeds.

In the present implementation, the third-party storage system includes a centralized content-addressable-storage (CAS) system, or a distributed CAS system.

In the present implementation, the blockchain includes any member blockchain in a consortium blockchain composed of a plurality of member blockchains.

In the present implementation, the third-party storage system is another member blockchain in the consortium blockchain that has a cross-chain data reference relationship with the described blockchain.

In the present implementation, the consortium blockchain is a directed acyclic graph (DAG) structure constructed based on a cross-chain data reference relationship between member blockchains.

For an implementation process of functions and roles of each module in the apparatus, references can be made to an implementation process of a corresponding step in the previous method. Details are omitted here for simplicity.

Because an apparatus implementation basically corresponds to a method implementation, for related parts, references can be made to related descriptions in the method implementation. The previously described apparatus implementation is merely an example. The modules described as separate parts can or cannot be physically separate, and parts displayed as modules can or cannot be physical modules, can be located in one position, or can be distributed on a plurality of network modules. Some or all of the modules can be selected based on actual needs to achieve the objectives of the solutions of the present specification. A person of ordinary skill in the art can understand and implement the implementations of the present application without creative efforts.

The system, apparatus, or module illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smart phone, a personal digital assistant, a media player, a navigation device, an email receiving and sending device, a game console, a tablet computer, a wearable device, or any combination of these devices.

Corresponding to the previously described method implementation, the present specification further provides an implementation of an electronic device. The electronic device includes a processor and a memory configured to store a machine-executable instruction, where the processor and the memory are usually connected to each other through an internal bus. In another possible implementation, the device can also include an external interface to enable communication with other devices or components.

In the present implementation, by reading and executing the machine-executable instruction that is stored in the memory and corresponding to a transaction execution control logic based on a blockchain, the processor is configured to: receive a target transaction, where at least a part of transaction content in the target transaction includes a content summary of target content stored in a third-party storage system connected to the blockchain; query, to the third-party storage system, target content corresponding to the content summary, and verify the target content; and if the verification of the target content succeeds, execute the target transaction based on the transaction content in the target transaction, and store the target transaction in a distributed database of the blockchain after the target transaction is executed.

In the present implementation, the third-party storage system stores a mapping relationship between the target content and the content summary of the target content; and by reading and executing the machine-executable instruction that is stored in the memory and corresponding to the transaction execution control logic based on a blockchain, the processor is configured to: use the content summary as a query index and initiate a query to the third-party storage system to query the target content corresponding to the content summary.

In the present implementation, by reading and executing the machine-executable instruction that is stored in the memory and corresponding to the transaction execution control logic based on a blockchain, the processor is configured to: calculate a content summary of the target content based on a preset summary algorithm; determine whether the content summary obtained through calculation is consistent with the content summary of the target content in the target transaction; and if the content summary obtained through calculation is consistent with the content summary of the target content in the target transaction, determine that the verification of the target content succeeds.

A person of ordinary skilled in the art can easily figure out another implementation of the present specification after thinking over the specification and practicing the present disclosure here. The present specification is intended to cover any variations, uses, or adaptations of the present specification, and these variations, uses, or adaptations follow the general principles of the present specification and include common knowledge or conventional techniques that are not disclosed in the technical field of the present specification. The specification and the implementations are merely considered as examples, and the actual scope and the spirit of the present specification are pointed out by the following claims.

It should be understood that the present specification is not limited to the precise structures that have been described above and shown in the drawings, and various modifications and changes can be made without departing from the scope of the present disclosure. The scope of the present specification is limited by the appended claims only.

The previous descriptions are merely preferred implementations of the present specification, but are not intended to limit the present specification. Any modification, equivalent replacement, or improvement made without departing from the spirit and principle of the present specification shall fall within the protection scope of the present specification.

Figure 5:
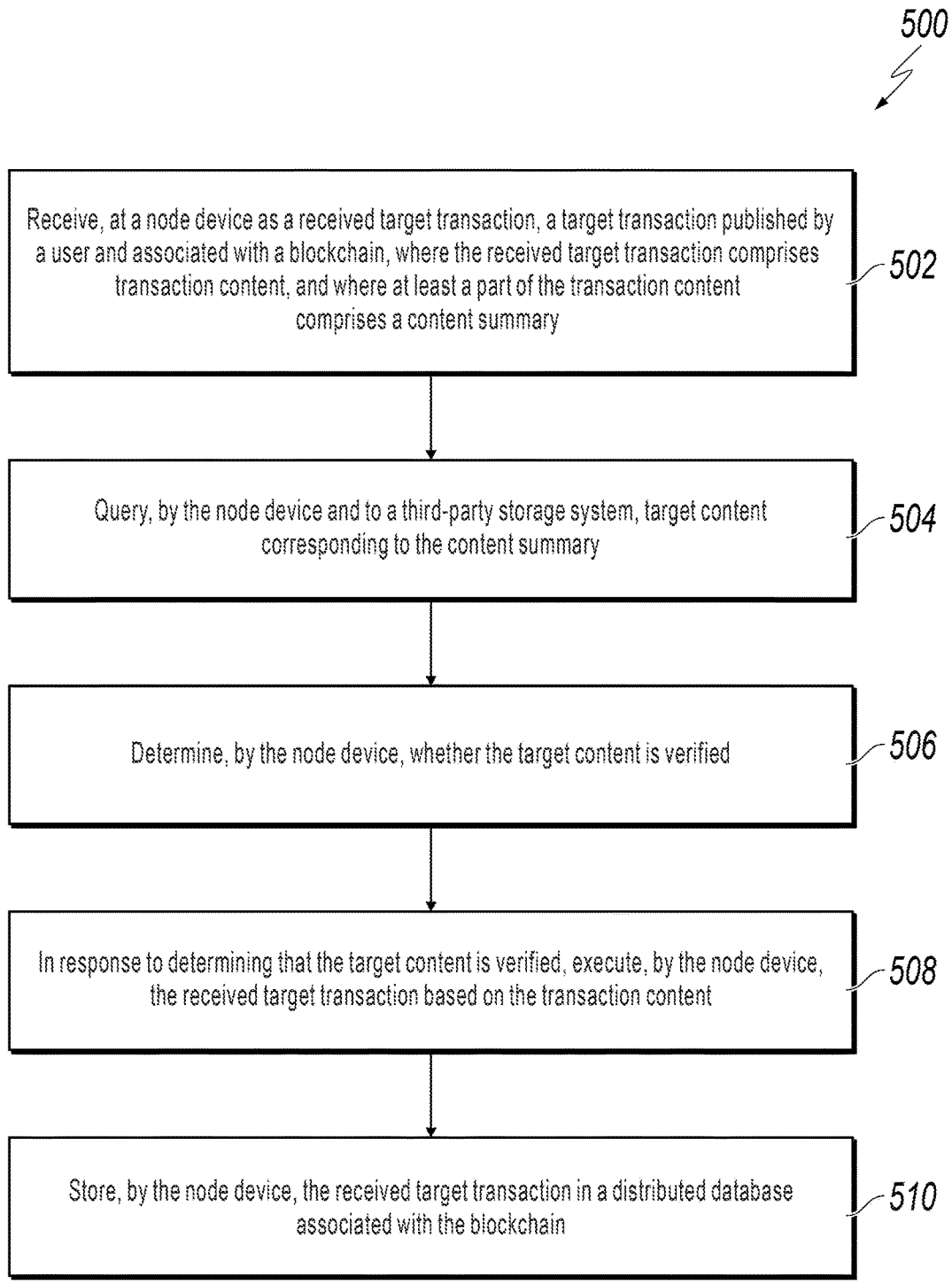
FIG. 5 is a flowchart illustrating an example of a computer-implemented method for executing a transaction based on a blockchain, according to an implementation of the present disclosure.

FIG. 5 is a flowchart illustrating an example of a computer-implemented method 500 for executing a transaction based on blockchain, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, at a node device associated with a blockchain as a received target transaction, a target transaction published by a user is received, where the received target transaction includes transaction content, and where at least a part of the transaction content includes a content summary associated with target content that is stored in a third-party storage system connected to the blockchain.

In some implementations, the blockchain is a member blockchain associated with a consortium blockchain network, wherein the consortium blockchain network comprises a number of member blockchains, and where each member blockchain in the consortium blockchain network is a third-party storage system connected to another member blockchain to implement a cross-chain data reference.

In some implementations, the third-party storage system includes a content-addressable-storage (CAS) platform that provides a data storage service for the number of the member blockchains, where the CAS platform uses the content summary of the stored target content as a query index of the target content, and where the CAS platform stores a mapping relationship between the query index and the target content. From 502, method 500 proceeds to 504.

At 504, by the node device and to the third-party storage system, the target content corresponding to the content summary is queried. From 504, method 500 proceeds to 506.

At 506, by the node device, whether the target content is verified is determined. In some implementations, determining whether the target content is verified includes identifying, by the node device as identified target content, the target content corresponding to the content summary carried in the received target transaction; recalculating, by the node device as recalculated content summary, the content summary of the identified target content; determining, by the node device, whether the recalculated content summary matches the content summary carried in the received target transaction; if it is determined that the recalculated content summary matches the content summary carried in the received target transaction: determining that the target content is verified and that the received target transaction is a valid transaction; and obtaining complete transaction content carried in the received target transaction; or if it is determined that the recalculated content summary does not match the content summary carried in the received target transaction: determining that the target content is not verified and that the received target transaction is invalid; and terminating the received target transaction. From 506, method 500 proceeds to 508.

At 508, in response to determining that the target content is verified, by the node device, the received target transaction is executed based on the transaction content.

In some implementations, executing the received target transaction based on the transaction content comprises automatically executing the received target transaction based on the complete transaction content by invoking a smart contract published in the blockchain.

In some implementations, the received target transaction published by the user is a standard transaction supported by the blockchain, and where executing the received target transaction includes determining, by the node device, whether the received target transaction is valid; in response to determining that the received target transaction is valid, broadcasting, by the node device, the received target transaction in the blockchain; synchronizing, by the node device, the received target transaction to other node devices in the blockchain to allow the other node devices to check a validity of the received target transaction; if a predetermined number of the other node devices determine that the received target transaction is valid, confirming, by the node device, that the received target transaction is valid and completing the received target transaction. From 508, method 500 proceeds to 510.

At 510, by the node device, the received target transaction is stored in a distributed database associated with the blockchain. In some implementations, storing the received target transaction in the distributed database comprises storing a transaction log and a transaction state of the received target transaction in the distributed database. After 510, method 500 can stop.

Implementations of the present application can solve technical problems in digital transaction execution processes. Traditionally, in a blockchain transaction process, transaction content in a transaction usually comes from data content stored in a distributed database of the blockchain, and data content stored in an external storage cannot be referred to. Therefore, for each node device in the blockchain network, when a transaction published by a member accessing the blockchain is executed, data content involved in the transaction content is all from the blockchain, and thus a "data use closed loop" is formed. What is needed is a technique to break a formed "data use closed loop" of the blockchain.

Implementation of the present application provide methods and apparatuses for improving blockchain based digital transaction execution by referencing immutable data content stored in a third-party storage platform as transaction content in a blockchain transaction. According to these implementations, the blockchain can be connected to a third-party storage system in advance. The third-party storage system can pre-store some immutable data content that can be referred to by the transaction published on the blockchain. When a member accessing the blockchain publishes a transaction to the blockchain, a content summary of the data content stored in the third-party storage system can be added to the transaction to refer to the data content stored in the third-party storage system as the transaction content. In addition, when the node device on the blockchain receives a transaction published by the member, the node device can initiate a query to the third-party storage system based on the content summary to query the data content corresponding to the content summary and verify the data content that is queried. If verification of the content succeeds, the transaction can be executed based on the complete transaction content in the transaction, and the transaction is stored in the distributed database of the blockchain after the transaction is completed.

In some implementations, the described methods and apparatuses can alleviate redundant data storage in the blockchain that is caused by synchronizing the original content of the target content stored in the previously described third-party storage system to each node device in the blockchain. This is because original content of the referenced data can be stored in the third-party storage system, and a content summary of the referenced data content is stored in the blockchain. When the blockchain performs a transaction or performs transaction tracing, the blockchain reads the original content of the referenced data from the third-party storage system based on the content summary.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
receiving, at a node device associated with a blockchain as a received target transaction, a target transaction published by a user, wherein the received target transaction comprises transaction content, and wherein at least a part of the transaction content comprises a content summary associated with target content that is stored in a third-party storage system connected to the blockchain;
querying, by the node device and to the third-party storage system, the target content corresponding to the content summary;

identifying, by the node device as identified target content, the target content corresponding to the content summary in the received target transaction;

recalculating, by the node device as recalculated content summary, the content summary of the identified target content;

determining, by the node device, that the recalculated content summary does not match the content summary in the received target transaction;

in response to determining that the recalculated content summary does not match the content summary in the received target transaction, determining that the target content is not verified and that the received target transaction is invalid; and terminating, by the node device, the received target transaction.

2. The computer-implemented method of claim 1, wherein the blockchain is a member blockchain associated with a consortium blockchain network, wherein the consortium blockchain network comprises a plurality of member blockchains, and wherein each member blockchain in the consortium blockchain network is an additional third-party storage system connected to another member blockchain to implement a cross-chain data reference.

3. The computer-implemented method of claim 2, wherein the third-party storage system comprises a content-addressable-storage (CAS) platform that provides a data storage service for the plurality of the member blockchains, wherein the CAS platform uses the content summary of the target content as a query index of the target content, and wherein the CAS platform stores a mapping relationship between the query index and the target content.

4. The computer-implemented method of claim 1, wherein determining the recalculated content summary does not match the content summary in the received target transaction comprises:

determining that a first data structure corresponding to the recalculated content summary does not match a second data structure corresponding to the content summary in the received target transaction.

5. The computer-implemented method of claim 1, wherein determining the recalculated content summary does not match the content summary in the received target transaction comprises:

determining that a first method of encoding corresponding to the recalculated content summary does not match a second method of encoding corresponding to the content summary in the received target transaction.

6. The computer-implemented method of claim 1, wherein determining the recalculated content summary does not match the content summary in the received target transaction comprises:

determining that a first summary algorithm corresponding to the recalculated content summary does not match a second summary algorithm corresponding to the content summary in the received target transaction.

7. A non-transitory, computer-readable medium storing one or more instructions executable by a computer system to perform operations comprising:

receiving, at a node device associated with a blockchain as a received target transaction, a target transaction published by a user, wherein the received target transaction comprises transaction content, and wherein at least a part of the transaction content comprises a content summary associated with target content that is stored in a third-party storage system connected to the blockchain;

querying, by the node device and to the third-party storage system, the target content corresponding to the content summary;

identifying, by the node device as identified target content, the target content corresponding to the content summary in the received target transaction;

recalculating, by the node device as recalculated content summary, the content summary of the identified target content determining, by the node device, that the recalculated content summary does not match the content summary in the received target transaction;

in response to determining that the recalculated content summary does not match the content summary in the received target transaction, determining that the target content is not verified and that the received target transaction is invalid; and terminating, by the node device, the received target transaction.

8. The non-transitory, computer-readable medium of claim 7, wherein the blockchain is a member blockchain associated with a consortium blockchain network, wherein the consortium blockchain network comprises a plurality of member blockchains, and wherein each member blockchain in the consortium blockchain network is an additional third-party storage system connected to another member blockchain to implement a cross-chain data reference.

9. The non-transitory, computer-readable medium of claim 8, wherein the third-party storage system comprises a content-addressable-storage (CAS) platform that provides a data storage service for the plurality of the member blockchains, wherein the CAS platform uses the content summary of the target content as a query index of the target content, and wherein the CAS platform stores a mapping relationship between the query index and the target content.

10. The non-transitory, computer-readable medium of claim 7, wherein determining the recalculated content summary does not match the content summary in the received target transaction comprises:

determining that a first data structure corresponding to the recalculated content summary does not match a second data structure corresponding to the content summary in the received target transaction.

11. The non-transitory, computer-readable medium of claim 7, wherein determining the recalculated content summary does not match the content summary in the received target transaction comprises:

determining that a first method of encoding corresponding to the recalculated content summary does not match a second method of encoding corresponding to the content summary in the received target transaction.

12. The non-transitory, computer-readable medium of claim 7, wherein determining the recalculated content summary does not match the content summary in the received target transaction comprises:

determining that a first summary algorithm corresponding to the recalculated content summary does not match a second summary algorithm corresponding to the content summary in the received target transaction.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, at a node device associated with a blockchain as a received target transaction, a target transaction published by a user, wherein the received target transaction comprises transaction content, and wherein at least a part of the transaction content comprises a content summary associated with target content that is stored in a third-party storage system connected to the blockchain;

querying, by the node device and to the third-party storage system, the target content corresponding to the content summary;

identifying, by the node device as identified target content, the target content corresponding to the content summary in the received target transaction;

recalculating, by the node device as recalculated content summary, the content summary of the identified target content determining, by the node device, that the recalculated content summary does not match the content summary in the received target transaction;

in response to determining that the recalculated content summary does not match the content summary in the received target transaction, determining that the target content is not verified and that the received target transaction is invalid; and terminating, by the node device, the received target transaction.

14. The computer-implemented system of claim 13, wherein the blockchain is a member blockchain associated with a consortium blockchain network, wherein the consortium blockchain network comprises a plurality of member blockchains, and wherein each member blockchain in the consortium blockchain network is an additional third-party storage system connected to another member blockchain to implement a cross-chain data reference.

15. The computer-implemented system of claim 14, wherein the third-party storage system comprises a content-addressable-storage (CAS) platform that provides a data storage service for the plurality of the member blockchains, wherein the CAS platform uses the content summary of the target content as a query index of the target content, and wherein the CAS platform stores a mapping relationship between the query index and the target content.

16. The computer-implemented system of claim 13, wherein determining the recalculated content summary does not match the content summary in the received target transaction comprises:
determining that a first data structure corresponding to the recalculated content summary does not match a second data structure corresponding to the content summary in the received target transaction.

17. The computer-implemented system of claim 13, wherein determining the recalculated content summary does not match the content summary in the received target transaction comprises:
determining that a first method of encoding corresponding to the recalculated content summary does not match a second method of encoding corresponding to the content summary in the received target transaction.

18. The computer-implemented system of claim 13, wherein determining the recalculated content summary does not match the content summary in the received target transaction comprises:
determining that a first summary algorithm corresponding to the recalculated content summary does not match a second summary algorithm corresponding to the content summary in the received target transaction.

* * * * *